(12) United States Patent
Olesen

(10) Patent No.: US 8,712,703 B2
(45) Date of Patent: Apr. 29, 2014

(54) TURBULENCE SENSOR AND BLADE CONDITION SENSOR SYSTEM

(75) Inventor: Ib Olesen, Randers SV (DK)

(73) Assignee: Vestas Wind Systems A/S, Aarhus N. (DK)

( * ) Notice: Subject to any disclaimer, the term of this patent is extended or adjusted under 35 U.S.C. 154(b) by 318 days.

(21) Appl. No.: 13/139,411

(22) PCT Filed: Dec. 14, 2009

(86) PCT No.: PCT/EP2009/008934
§ 371 (c)(1),
(2), (4) Date: Jun. 13, 2011

(87) PCT Pub. No.: WO2010/069534
PCT Pub. Date: Jun. 24, 2010

(65) Prior Publication Data
US 2011/0246094 A1 Oct. 6, 2011

Related U.S. Application Data

(60) Provisional application No. 61/122,974, filed on Dec. 16, 2008.

(30) Foreign Application Priority Data

Dec. 16, 2008 (GB) .................................. 0822930.4

(51) Int. Cl.
*G06F 19/10* (2011.01)
*G01B 3/44* (2006.01)

(52) U.S. Cl.
USPC .................. 702/34; 702/49; 416/37; 416/91; 416/61; 415/118

(58) Field of Classification Search
USPC ........... 702/34, 49; 700/282; 416/37, 91, 147, 416/169 R, 61, 95, 146 R; 73/800, 170.01, 73/633; 415/4.3, 4.5, 118, 908; 356/35.5, 356/32
See application file for complete search history.

(56) References Cited

U.S. PATENT DOCUMENTS 4,387,993 A 6/1983 Adrian
4,671,659 A 6/1987 Rempt et al.
(Continued)

FOREIGN PATENT DOCUMENTS

DE 31 06 624 9/1982
DE 31 48 867 6/1983
(Continued)

OTHER PUBLICATIONS

David Biloen; International Preliminary Report on Patentability issued in International Application No. PCT/IB2009/007018; Mar. 7, 2011; 9 pages; European Patent Office.
(Continued)

*Primary Examiner* — Carol S Tsai
(74) *Attorney, Agent, or Firm* — Patterson & Sheridan, LLP

(57) ABSTRACT

The invention comprises a turbulence sensor and sensor system for determining the condition of a wind turbine blade. A turbulence sensor comprises a sensor membrane provided in the surface of a wind turbine blade. A light source and light detector provided in a sensor cavity in the blade illuminate the sensor membrane and detect the light reflected back. The reflected light is mixed with non-reflected light to give an interference pattern indicative of the quality of the airflow, whether it is laminar or turbulent. The turbulence sensor can be used in a sensor system for detecting the accumulation of unwanted matter, such as dirt or ice, on the blade.

19 Claims, 4 Drawing Sheets

(56) References Cited

U.S. PATENT DOCUMENTS

| | | | |
|---|---|---|---|
| 4,681,025 A * | 7/1987 | Carty | 454/44 |
| 4,912,530 A | 3/1990 | Bessho | |
| 4,996,419 A | 2/1991 | Morey | |
| 5,009,505 A | 4/1991 | Malvern | |
| 5,094,527 A | 3/1992 | Martin | |
| 5,160,976 A | 11/1992 | Carr et al. | |
| 5,201,015 A | 4/1993 | von Bieren et al. | |
| 5,250,802 A | 10/1993 | Runner | |
| 5,308,973 A | 5/1994 | Odoni | |
| 5,488,475 A | 1/1996 | Friebele et al. | |
| 5,633,748 A | 5/1997 | Perez et al. | |
| 5,649,035 A | 7/1997 | Zimmerman et al. | |
| 5,726,744 A | 3/1998 | Ferdinand et al. | |
| 5,973,317 A | 10/1999 | Hay | |
| 6,125,216 A | 9/2000 | Haran et al. | |
| 6,301,968 B1 | 10/2001 | Maruyama et al. | |
| 6,586,722 B1 | 7/2003 | Kenny et al. | |
| 6,612,810 B1 * | 9/2003 | Olsen et al. | 416/95 |
| 6,640,647 B1 | 11/2003 | Hong et al. | |
| 6,850,821 B2 * | 2/2005 | Weitkamp | 700/286 |
| 6,940,185 B2 * | 9/2005 | Andersen et al. | 290/44 |
| 6,940,186 B2 * | 9/2005 | Weitkamp | 290/44 |
| 7,059,822 B2 * | 6/2006 | LeMieux et al. | 415/4.3 |
| 7,086,834 B2 | 8/2006 | LeMieux | |
| 7,476,985 B2 * | 1/2009 | Llorente Gonzalez | 290/44 |
| 7,703,331 B2 | 4/2010 | Magne et al. | |
| 7,726,943 B2 * | 6/2010 | Stommel | 416/61 |
| 7,908,923 B2 * | 3/2011 | Bosselmann et al. | 73/584 |
| 8,002,523 B2 * | 8/2011 | Borden | 416/1 |
| 8,123,480 B2 * | 2/2012 | Enevoldsen et al. | 416/61 |
| 8,322,206 B2 * | 12/2012 | Hucker et al. | 73/147 |
| 8,408,871 B2 * | 4/2013 | Herr et al. | 416/37 |
| 8,463,085 B2 * | 6/2013 | Cribbs | 385/13 |
| 2002/0057436 A1 | 5/2002 | Skinner et al. | |
| 2003/0066356 A1 | 4/2003 | Kanellopoulos et al. | |
| 2003/0127587 A1 | 7/2003 | Udd et al. | |
| 2004/0057828 A1 | 3/2004 | Bosche | |
| 2004/0114850 A1 | 6/2004 | Dewyntermarty et al. | |
| 2004/0252290 A1 | 12/2004 | Ferguson et al. | |
| 2005/0088660 A1 | 4/2005 | Ronnekleiv | |
| 2005/0276696 A1 | 12/2005 | LeMieux | |
| 2006/0000269 A1 * | 1/2006 | LeMieux et al. | 73/170.01 |
| 2006/0146337 A1 | 7/2006 | Hartog | |
| 2006/0285813 A1 | 12/2006 | Ferguson | |
| 2007/0223004 A1 | 9/2007 | Baillon et al. | |
| 2007/0280582 A1 | 12/2007 | Sanders | |
| 2007/0284112 A1 | 12/2007 | Magne et al. | |
| 2008/0013879 A1 | 1/2008 | Mossman | |
| 2008/0317598 A1 | 12/2008 | Barbu et al. | |
| 2009/0097976 A1 | 4/2009 | Driver et al. | |
| 2010/0011862 A1 * | 1/2010 | Kuhlmeier | 73/587 |

FOREIGN PATENT DOCUMENTS

| | | |
|---|---|---|
| DE | 195 24 036 | 7/1996 |
| DE | 253 669 | 1/1998 |
| DE | 199 23 087 | 12/2000 |
| DE | 199 27 015 | 12/2000 |
| DE | 202 06 704 | 8/2002 |
| DE | 101 60 522 | 6/2003 |
| DE | 103 15 676 | 11/2004 |
| EP | 0 640 824 | 3/1995 |
| EP | 0 857 291 | 5/1997 |
| EP | 0 984 243 | 3/2000 |
| EP | 1 148 324 | 10/2001 |
| EP | 1 249 692 | 10/2002 |
| EP | 1 359 321 | 11/2003 |
| EP | 1 466 827 | 10/2004 |
| EP | 1 586 854 | 10/2005 |
| EP | 1 770 278 | 4/2007 |
| EP | 1 780 523 | 5/2007 |
| EP | 1 873 395 | 1/2008 |
| EP | 1 911 968 | 4/2008 |
| EP | 2 025 929 | 2/2009 |
| EP | 2 075 462 | 7/2009 |
| FR | 2 707 754 | 1/1995 |
| GB | 2 105 846 | 3/1983 |
| GB | 2 284 256 | 5/1995 |
| GB | 2 326 471 | 12/1998 |
| GB | 2 398 841 | 9/2004 |
| GB | 2 409 517 | 6/2005 |
| GB | 2 421 075 | 6/2006 |
| GB | 2 428 748 | 2/2007 |
| GB | 2 440 953 | 2/2008 |
| GB | 2 440 954 | 2/2008 |
| GB | 2 440 955 | 2/2008 |
| GB | 2466433 | 6/2010 |
| JP | 55-69006 | 5/1980 |
| JP | 58-153107 | 9/1983 |
| JP | 60-100707 | 6/1985 |
| JP | 10-69922 | 3/1989 |
| JP | 6-117914 | 4/1994 |
| JP | 2000-111319 | 4/2000 |
| JP | 2003-302536 | 10/2003 |
| JP | 2007-114072 | 5/2007 |
| LV | 11378 | 8/1996 |
| LV | 11389 | 8/1996 |
| RU | 780 654 | 3/1996 |
| SU | 577398 | 10/1977 |
| WO | 97/15805 | 5/1997 |
| WO | 0023764 | 4/2000 |
| WO | 00/28294 | 5/2000 |
| WO | 00/39548 | 7/2000 |
| WO | 01/33075 | 5/2001 |
| WO | 02/053910 | 7/2002 |
| WO | 03/076887 | 9/2003 |
| WO | 2005/024349 | 3/2005 |
| WO | 2005/071382 | 8/2005 |
| WO | 2005/071383 | 8/2005 |
| WO | 2006/021751 | 3/2006 |
| WO | 2006/063990 | 6/2006 |
| WO | 2007/099290 | 9/2007 |
| WO | 2007/104306 | 9/2007 |
| WO | 2008/101496 | 8/2008 |
| WO | 2009/046717 | 4/2009 |

OTHER PUBLICATIONS

Jonathan Charles Teixeira Moffat; Office Action issued in U.S. Appl. No. 13/119,871; Jun. 30, 2011; 23 pages; U.S. Patent and Trademark Office.

Jonathan Charles Teixeira Moffat; Office Action issued in U.S. Appl. No. 13/119,871; Dec. 13, 2011; 18 pages; U.S. Patent and Trademark Office.

Gareth John; Search Report issued in Great Britain Application No. GB0812037.0; Sep. 16, 2008; 4 pages; Great Britain Intellectual Property Office.

P. Ganci; International Search Report issued in International Application No. PCT/GB96/02606; Jan. 28, 1997; 2 pages; European Patent Office.

Robert MacDonald; Combined Search and Examination Report issued in Great Britain Application No. GB0812258.2; Nov. 7, 2008; 6 pages; Great Britain Intellectual Property Office.

Christopher Smith; Search Report issued in Great Britain Application No. GB0814651.6; Dec. 4, 2008; 1 page; Great Britain Intellectual Property Office.

Tony Oldershaw; Examination Report issued in Great Britain Application No. GB0814651.6; May 1, 2009; 2 pages; Great Britain Intellectual Property Office.

Tony Oldershaw; Combined Search and Examination Report issued in Great Britain Application No. GB0817341.1; Jan. 12, 2009; 4 pages; Great Britain Intellectual Property Office.

David Biloen; International Search Report and Written Opinion issued in International Application No. PCT/IB2009/007018; Oct. 7, 2010; 6 pages; European Patent Office.

Lars Jakobsson; International Search Report issued in International Application No. PCT/NO03/00087; Jun. 10, 2003; 3 pages; European Patent Office.

James Paddock; Combined Search and Examination Report issued in Great Britain Application No. GB0913739.9; Nov. 30, 2009; 4 pages; Great Britain Intellectual Property Office.

(56) References Cited

OTHER PUBLICATIONS

Daniel Jones; Combined Search and Examination Report issued in Great Britain Application No. GB1004162.2; Sep. 13, 2010; 8 pages; Great Britain Intellectual Property Office.

Mike Walker; Combined Search and Examination Report issued in Great Britain Application No. GB1001855.4; Mar. 22, 2010; 7 pages; Great Britain Intellectual Property Office.

Tony Oldershaw; Combined Search and Examination Report issued in priority Great Britain Application No. GB0822930.4; Mar. 26, 2009; 6 pages; Intellectual Property Office.

Christoph Felicetti; International Search Report and Written Opinion issued in priority International Application No. PCT/EP2009/008934; Apr. 27, 2010; 11 pages; European Patent Office.

* cited by examiner

TURBULENCE SENSOR AND BLADE CONDITION SENSOR SYSTEM

The present invention relates to a turbulence sensor and blade condition sensor system, and in particular to a turbulence sensor and sensor system for installation in a wind turbine to detect accumulated matter such as dirt and ice on wind turbine components.

FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model used, such as those that are suitable for use in large scale electricity generation on a wind farm for example. In the latter case, the diameter of the rotor could be as large as 100 meters or more.

Wind turbines are often located in areas where conditions are harsh, such as offshore, coastal, or elevated areas, and during operation unwanted matter, such as ice and dirt, can often accumulate on the surface of the wind turbine components. Ice in particular can accumulate very rapidly as a result of sudden changes in climate conditions.

Accumulation of such matter is undesirable as it can reduce the lifetime of a component, either by corrosion, increased wear, or increased mechanical stress resulting from the extra weight of the matter. In the worst case, such matter can result in a premature and complete failure of a turbine component.

Due to the often inaccessible location of wind turbines, the applicants have appreciated that a way of detecting the build up of undesirable matter on wind turbine components is desirable, so that maintenance of wind turbine components can be carried out more efficiently, and the lifetime of the components improved.

Additionally, in most wind turbines, such as those operating using pitch or stall control the pitch of the rotor blades relative to the wind direction is carefully controlled to extract the optimal power from the wind, and to avoid dangerous overloads at the generator. An accumulation of matter on the blades can make them less efficient in extracting power from the wind, and can additionally make it more difficult to accurately control their pitch for power regulation and safety. A way of detection the accumulation of unwanted matter on wind turbine blades is therefore particularly desirable.

SUMMARY OF THE INVENTION

According to an embodiment of the invention, a turbulence sensor for a wind turbine component having a cavity is provided. The turbulence sensor comprises: a sensor membrane, for detecting the turbulence of air flow past a surface of the wind turbine component, wherein the sensor membrane is integral to the surface, and covers at least part of the cavity; a light source located in the sensor cavity for illuminating the surface of the sensor membrane inside the cavity; a light detector located in the cavity for detecting light reflected from the surface of the membrane, and for providing an output to a processor, the processor determining from the output a turbulence value for the air flow across the sensor membrane.

The invention provides a sensitive sensor system due to the fact that small displacements of the sensor membrane can be detected using the light source and detector. Further, the sensor is relatively easy to install and can be situated in the wind turbine blade for protection, and to ensure that the presence of the sensor does not interfere with the measurement. As there are few moving parts, the sensor is resistant to extreme changes of temperature.

In one embodiment, the light source and light detector in the cavity are optical fibres connected to an opto-electrical light source. This allows the use of electrical components in the sensor to be avoided, and means that the sensor will be resistant to lighting strikes. These are especially common for wind turbine blades. Any electrical components for the sensor can be housed in part of the wind turbine that is electrically shielded.

Preferably, the sensor comprises an adder for adding light reflected from the surface of the membrane to a reference light signal to give an interference pattern that indicates displacement of the membrane. Use of an interference pattern provides the most accurate way of interpreting the displacement of the membrane, as small displacements of the membrane can be used to give large variations in intensity. For larger displacements, a sinusoidal intensity pattern is produced, meaning that information about the speed at which the displacement is occurring as well as the direction of displacement can be obtained from analysis of the sinusoidal frequency and rate of occurrence.

In one embodiment, the adder comprises a partial mirror located in the sensor cavity to reflect a portion of the light from the light source to the light detector and provide the reference light signal. Thus, all of the components of the sensor are provided locally inside the sensor cavity for ease of replacement and maintenance.

In a further embodiment, the sensor cavity is sealed. This allows the cavity environment to be maintained at levels of humidity and temperature that ensure good operation of the sensor membrane. Furthermore, the cavity may be filled with a gas other than air, such as an inert gas.

In one embodiment, the sensor membrane may be formed of a different material to that from which the surface of the wind turbine component is formed. This allows it to be tailored more precisely to its function as a sensor, in terms of tension and responsiveness. Depending on installation, the sensor membrane may alternatively be formed by the blade surface itself.

In an embodiment, the turbulence sensor comprises a processor for analysing the sinusoidal variations in the interference pattern over a predetermined period of time to determine whether the air flow is turbulent. The processor may analyse the pattern using pattern recognition or statistical techniques and give a determination with an associated level of confidence. Analysis for a longer period of time may give a higher degree of confidence in the sensor outcome.

In a further aspect of the invention, a sensor system for detecting the surface condition of a wind turbine blade is provided. The sensor system comprises: one or more turbulence sensors according to the first aspect above, for giving an output indicating turbulent air flow across a surface of the wind turbine blade; a memory; and a processor; wherein the processor determines a condition of the blade surface from the output received from the one or more turbulence sensors. Changes in the blade condition, such as deterioration of the blade surface or accumulation of matter such as dirt or ice, will greatly affect the flow of air across the blade surface. The turbulence sensors described provide a reliable and inexpensive way of detecting changes in blade condition.

Preferably, the memory records the outputs received from the one or more turbulence sensors over a period of time, and the processor determines a condition of the blade surface based on a change in the outputs compared with past outputs. This allows the past outputs of the turbulence sensor to act as a reference for comparison with the instantaneous or current readings being taken. Accumulation of dirt for example, may manifest itself as a gradual increase in the turbulence detected. Ice accumulation on the other hand may occur quickly over a number of hours. Thus, the nature of the matter can also be deduced. Preferably, the sensor system comprises a plurality of sensors on the windward and leeward sides of the blade, so that a complete sensor view is obtained.

In a further embodiment, the processor compares the outputs from the turbulence sensors of one wind turbine blade with those of another. This allows the processor to give an indication of whether the blades are mounted and operating correctly, and provides additional data for comparison of blade condition. Preferably, the sensor system detects the accumulation of matter on the blade surface.

Preferably, the processor determines a condition of the blade surface, in which matter is taken to have accumulated on the blade surface, when a predetermined number of the turbulence sensors indicate turbulence.

The invention also provides a wind turbine comprising a turbulence sensor or a blade condition sensor system as described above.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENTS

Figure 1:
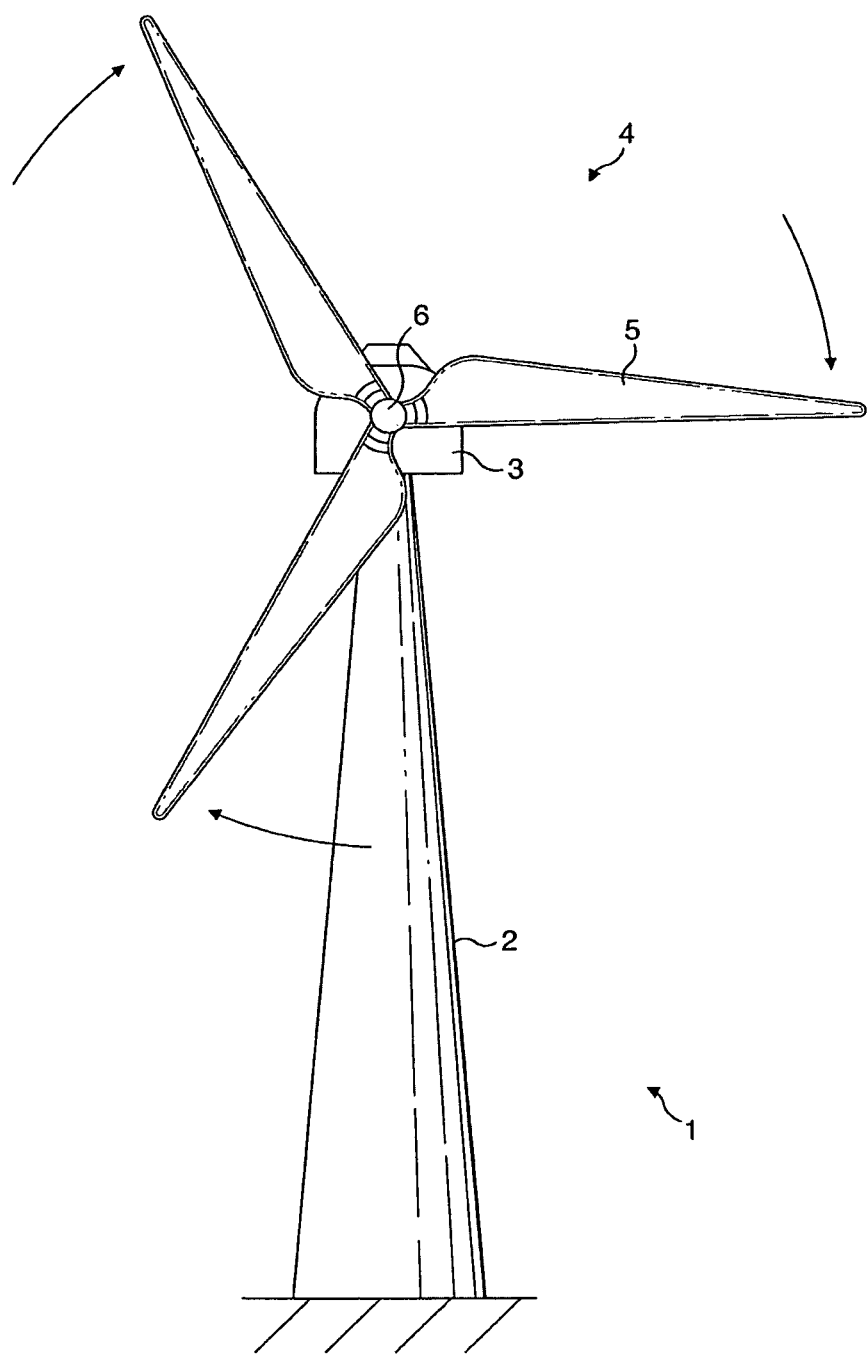
FIG. 1 illustrates a wind turbine.
Figure 2:
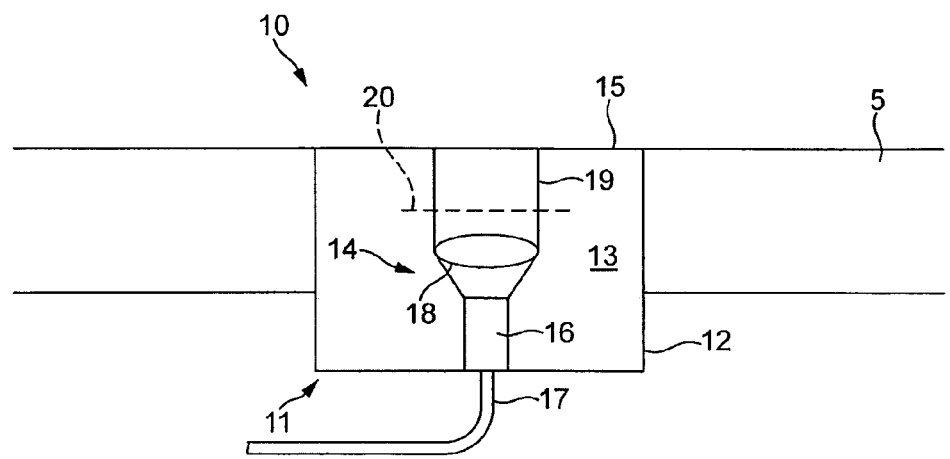
FIG. 2 illustrates a first example of a turbulence sensor according to the invention.

FIG. 2 illustrates a first example of a turbulence sensor according to a preferred embodiment of the invention. The turbulence sensor is shown in situ integrated into the blade of a wind turbine rotor, or other component.

The sensor 10 comprises a sensor housing 11, having side walls 12 that define a cavity 13. In the cavity 13, sensor apparatus, denoted generally by reference number 14, is situated. One surface of the sensor housing 11 is provided with a sensor membrane 15. In practice, the sensor 10 is mounted in the blade 5 such that the sensor membrane 15 separates the cavity 13 from the outside air, and such that the membrane 15 is in contact with the air flow across the surface of the blade. The cavity is entirely sealed off from the external environment by the side walls 12 and the membrane 15, so that movement of the membrane surface can be considered wholly attributable to variations in the air flow across the blade surface 5. Sealing the cavity also acts to keep the internal surface of the membrane clean, and allows the internal environment of the cavity to be regulated to avoid build up of moisture that could affect the sensor membrane 15 and apparatus 14. The cavity 13 may for example be filled with a gas other than air, such as an inert gas, that gives a better operating environment for the membrane.

Preferably, the blade surface 5 and the membrane 15 are arranged so that they form a smoothly continuous blade surface. It is undesirable both for the aerodynamic properties of the blade and for the sensitivity of the sensor if the connection between the membrane 15 and the blade surface is not continuous as this may introduce obstructions or impediments into the air flow.

The membrane 15 is arranged such that it is susceptible to changes in air flow at the surface of the wind turbine component. It is therefore relatively thin, in some embodiments between 0.5 and 2 mm, and is tensioned so that turbulent airflow will result in only a small movement of the membrane surface. An interference pattern is produced by shining light on to the membrane in order to measure the displacement of the membrane. In practice, therefore, a range of movement of the membrane of the order of several pm has been found advantageous, owing to the wavelength of the light used. The choice of the membrane material is critical to ensure it is suitable for measurement. A material that is too light and flexible will be too sensitive to changes in air flow even in laminar conditions will not be suitable for distinguishing turbulent and laminar flow. Preferably, the material is therefore strong and stiff enough to ensure that only strong vibrations (in the range of 10 to 100 Hz, say) from turbulent air flow give a sufficient interference signal.

It is possible to use the outside surface of the rotor blade itself as the membrane 15. In this case, the sensor apparatus 14 can be installed in the rotor blade 5 under the outer surface, with or without the sensor housing 11 creating a sealed cavity for the apparatus. If the sensor 10 is installed into the rotor blade 5 or other wind turbine component, as a separate unit, then a hole of diameter 30 to 100 mm has been found adequate to accommodate the sensor housing 11 and apparatus 14.

The internal construction of the sensor apparatus 14 will now be explained in more detail. Sensor apparatus 14 comprises a light source 16 aimed at the membrane 15. Where possible, it is advantageous to avoid the use of electrical components in rotor blades as they are more susceptible to damage from lighting strikes. Thus, the light source 16 preferably comprises an optical fibre 17 connected to an opto-electronic light source, such as a photo-diode or laser, located remotely in the rotor blade hub. In this embodiment the light source 16 constitutes the exposed end of the optical fibre 17 and a suitable mount to support the fibre in the sensor cavity and ensure that it is securely aimed at the membrane 15.

In FIG. 2, the light source 16 comprising the optical fibre 17 also acts as a receiver for light that is reflected back from the membrane 15. The light source 16 is therefore arranged perpendicularly to the membrane 15 so that at least some of the reflected light from the membrane will be incident on the open end of the optical fibre. The apparatus 14 optionally comprises one or more lenses 18 provided between the optical fibre 17 and the membrane 15. In this way, a beam of light 19 emitted from the fibre 17 may be focused into a tighter beam incident on the membrane and the beam reflected back can be at least partially focused on the end of the fibre 17.

The apparatus 14 may also comprise a partially reflecting mirror 20, located between the membrane and the optical fibre 17. In this way, the optical fibre will receive light reflected back from both the plane of the mirror 20 and also from the plane of the membrane 15. If one or more lenses 18 are installed, the partially reflecting mirror 20 may be advantageously located between the membrane 15 and the one or more lenses 18. The apparatus 14 may be secured inside cavity 13 by suitable connections to housing walls 12.

It will be appreciated that some internal reflection of the light in the optical fibre 17 will occur at the fibre to air interface in the fibre 17. As a result, even without the partial mirror 20, an interference pattern can be produced using solely the optical fibre 17 and the membrane surface 15. However, the amount of light subject to internal reflection is only around 4% of the total. While this is sufficient to produce a useful reference signal to interfere with the sensor signal from the membrane 15, in some embodiments it is useful to provide a stronger unreflected reference signal. As reflection from the partial mirror is around 40 to 50%, and the reflection from the membrane 15 a similar order of magnitude, the partial mirror provides a reference and sensor signal of similar magnitude. It also allows light sources that are not especially powerful to be used, thereby making the sensor cheaper to produce. In this case, the most significant interference occurs at the partial mirror, although as before, interference will still occur at the fibre to air interface.

Locating the partially reflecting mirror 20 in the sensor cavity 13 is advantageous, as it means that all of the components likely to require installation and maintenance are located together in same location of the component. Alternatively, the partially reflecting mirror may be omitted from cavity and located instead in the path of the optical fibre 17, as will be described below. This can be useful if it is desired to save space in the sensor cavity 13.

In the sensor described above with reference to FIG. 2, a single optical fibre 17 is used as to form a single light source and receiver sensor pair. The interference may occur in the cavity 13 as described above, either at the mirror or fibre interface, or even at a location away from the cavity, if the returned signal is interfered with a reference light signal.

Figure 3:
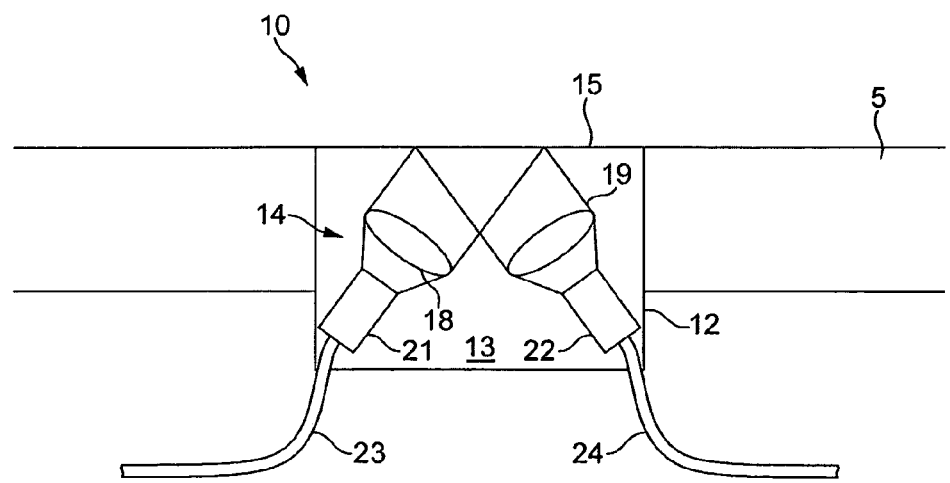
FIG. 3 illustrates a second example of a turbulence sensor according to the invention.

An alternative embodiment will now be described with reference to FIG. 3. In FIG. 3 the sensor apparatus 14 comprises a light source optical fibre 21 and 23 and a light receiving optical fibre 22 and 24. The optical fibres are typically angled so that the beam from one fibre 21, is reflected by the membrane 15, and is subsequently incident on the other fibre 22. As before, the light that is incident on the membrane 15 undergoes a change in path length as a result of movement of the membrane with respect to the sensor cavity. This light is then received by the other fibre 22 and is interfered with an unreflected, or reference portion of the light, in order to produce an interference pattern. In FIG. 3, the light is transmitted to and from the sensor cavity by means of the different optical fibres 23 and 24.

Other suitable arrangements of sensor could be implemented and will occur to the skilled person.

Figure 4:
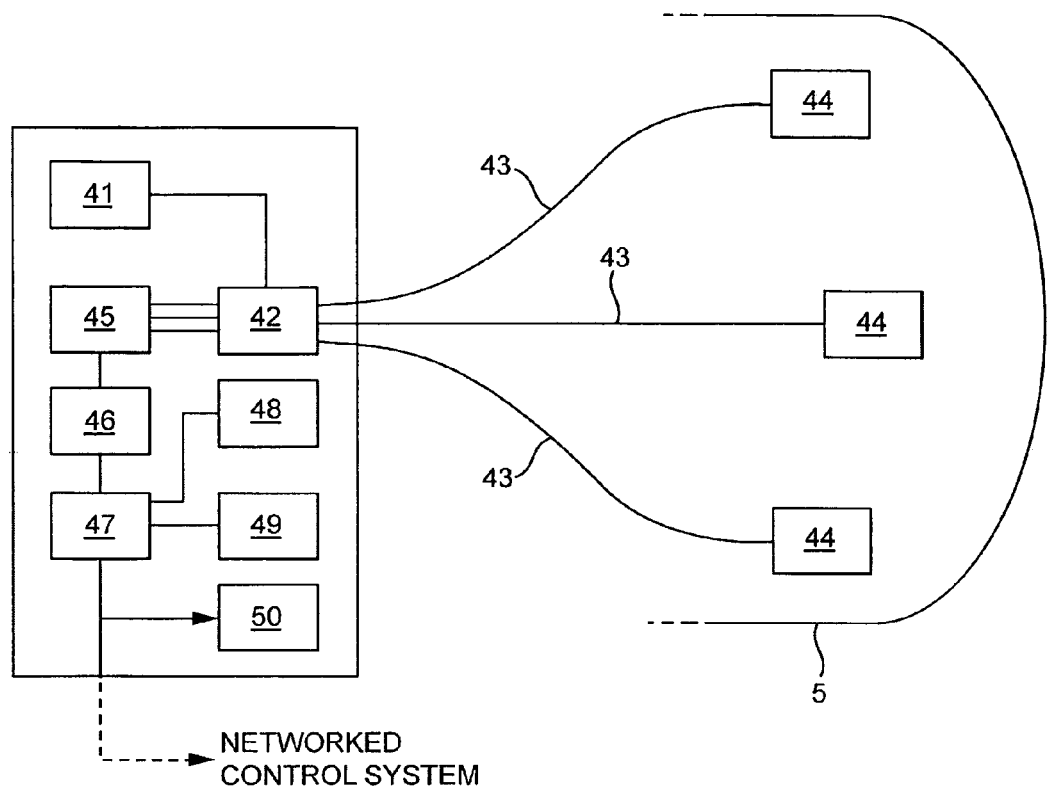
FIG. 4 illustrates an example sensor system incorporating sensors such as those shown in FIG. 2 or 3.

The turbulence sensors shown in FIG. 2 or 3 are part of a larger wind turbine sensing and control system 40 as shown in FIG. 4. The turbine sensing and control system 40 comprises one or more light sources 41, such as a laser or photo diodes, coupled to one or more optical mixers 42. The optical mixer for example can be used to provide mixing of the reflected signal light, and unreflected reference light in cases where the partial mirror 20 is not used in the sensor cavity.

Optical fibres 43 are connected between the one or more optical mixers 42 and respective turbulence sensors 44. The turbulence sensors 44 may for example be those illustrated in FIGS. 2 and 3 above, in which case fibres 43 correspond to fibres 17, 23 and 24 as shown in the figures. Additionally, the fibres 43 carry reflected light signals from the turbulence sensors back to the optical mixer 42.

As shown in FIG. 4, a plurality of sensors 44 are preferably distributed at a number of different locations across the leeward or windward surfaces of the wind turbine blades. The number of sensors per blade may be three or greater, per blade surface, for example. In this way, variations in air flow caused by accumulation of matter can be detected by comparison of the different signals. This will be explained in more detail below.

The optical mixer 42 is coupled to light sensing device 45. For each turbulence sensor, the light sensing device 45 receives at least two light signals, the first being a light signal that has been reflected from the membrane 15, and the second being a reference signal. As noted above, the reference signal may have been reflected, not by the membrane 15, but by the partially reflecting mirror 20, or the fibre to air interface in the sensor cavity 13. Alternatively, the reference signal may be light received directly or indirectly from light source 41 either at the light sensing device 45, optical mixer 42, or other optical mixer in the light path. Optical mixer 42 is preferable as a portion of the light from the light source can then simply be diverted directly to the light sensor 45.

The light sensor 45 is in turn connected to an Analogue to Digital Converter (ADC) 46 which is connected to a processor 47 for processing the results. Processor 47 preferably has access to a timer unit 48 and a memory 49.

Many wind turbines, especially those installed in wind parks, are monitored and controlled by sophisticated control systems, such as the SCADA Supervisory Control and Data Acquisition system. It will therefore be appreciated that in practice, processor 47 will typically be connected to a larger control system, and may have access to data or information gathered at the wind turbine other than that received from the turbulence sensor. This need not always be the case however, such as where turbines are installed as stand-alone individual units.

Preferably the light source 41, the light sensor 45, the ADC 46 and processor 47 are housed separately from the rotor blade, either in the rotor blade hub, or in the nacelle, where they may be protected from lighting strikes by a suitable arrangement of lighting conductors or electrical shielding.

It will be appreciated that the phase of the reference signal, even in the arrangements where the partially reflecting mirror is used in the cavity, will be solely determined by the phase of the light source 41. In general, differences in lengths of optical fibres (unless these are made deliberately long) can be ignored. The phase of the signal that has been reflected by the membrane will however vary according to the optical path length between the emitting and receiving optical fibres 17, 23 or 24 in the sensor cavity 13. In turn, this path length is affected by movement or vibration of the membrane 15 caused by the air flow past outer surface of the blade 5. Thus by allowing the two signals to interfere with one another and sensing changes in phase of the two signals, information can be generated about the quality of the air flow.

In ideal operating conditions, the air flow across the surface of the rotor blade will be laminar, resulting in little or no disturbance of the membrane 15. Turbulent air flow caused by the accumulation of matter on the surface of the rotor blade or by the pitch of the blade inducing stall like conditions will result in sudden and unpredictable movement of the membrane 15 and associated changed in phase of the light reflected back from the membrane relative to the reference phase.

Figure 5:
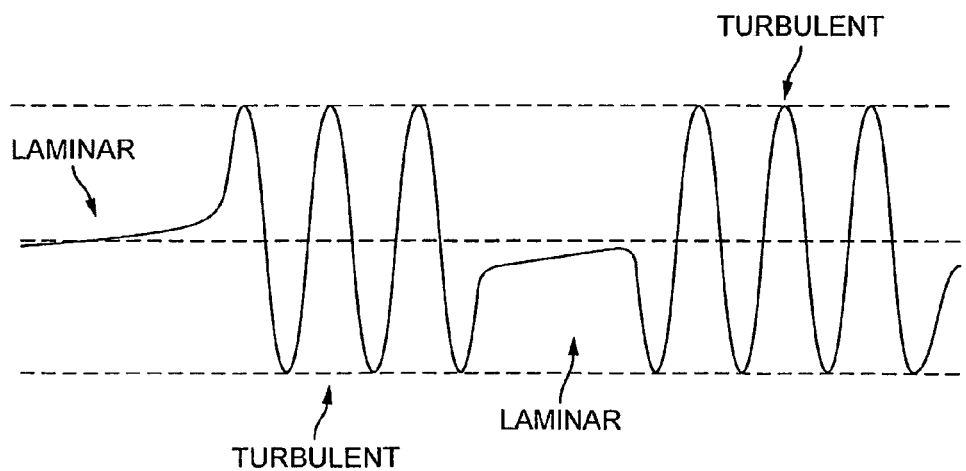
FIG. 5 is an illustration of an example intensity pattern developed from the sensor signals.

FIG. 5 is a line graph schematically illustrating a sensor signal developed by the processor 47 over time, based upon the interference between the reference and sensor light signals. Beginning at the left of the diagram, the flat region of the graph corresponds to periods in which the membrane is not moving. The phase difference between the sensor signal and the reference signal is therefore constant, and the line graph is flat. Gentle movement of the membrane under the influence of external atmospheric pressure will be reflected by small changes in phase and associated changes in the intensity of the resulting light signal due to the interference.

If the membrane moves further, then the phase between the reference signal and the sensor signal will change and result in further changes in intensity. If the magnitude of the movement of the membrane is sufficiently large, a sinusoidal variation in the intensity of the light will be seen as the phase difference increases through complete phase oscillations. The sinusoidal variation will continue for the period in which the membrane is moving, and will reverse direction as the direction of movement of the membrane reverses. The time taken for the intensity to vary from peak to peak additionally indicates the time taken for the membrane to move half of the distance indicated by the wavelength of the light signal.

The intensity graph of FIG. 5 which is developed by the processor can therefore be used to give an indication of the air flow conditions across the surface of the blade. Turbulent air flow will result in buffeting of the blade and the sensor membrane, and the corresponding graph of intensity will indicate frequent and chaotic movements of the membrane. This will be characterised by many occurrences of sinusoidal variation of the signal, and relatively few periods where the intensity is essentially unchanging or is changing slowly. Further the sinusoidal variations themselves are likely to have higher frequencies of oscillation, indicating faster movement of the membrane than at other times.

Laminar air flow or non-turbulent background conditions, on the other hand, will result in little or less movement of the membrane. The intensity graph would therefore be characterised by more and longer periods of flat lines, gentle variations, or periods in which although a sinusoidal variation is seen, it has a long wavelength indicating that it is occurring relatively slowly.

The flat line regions of the graph representing no movement of the membrane may or may not always indicate the same intensity of light. In practice, although the rest position of the membrane may be largely determined at least in part by the membrane tension and the material of which the membrane is made, the instantaneous force exerted by the air flow will ultimately determine the instantaneous position.

The processor 47 analyses the intensity of the light signals received at ADC 46, to determine the present quality of air flow across the blade. It may do this using any suitable mathematical processing techniques to determine the amount of variation in the light interference signal, such as that shown in FIG. 5. In other embodiments, it may use neural network techniques to develop a memory of the visual appearance of the intensity patterns for turbulent and laminar air flow, and determine the current air flow conditions by comparison with pre-developed model patterns. Such patterns may be stored in memory 49.

As well as identifying whether the results from an individual sensor 44 indicate turbulence, the processor 47 has the further function of assessing the current operating performance of the wind turbine blades based on the results collected from the plurality of sensors 44 over time. It will be appreciated that a separate processor could be provided for this purpose, but that for the sake of simplicity in the present description, processor 47 will be assumed to perform both roles.

The processor preferably takes continuous or periodic readings from the turbulence sensors 44 to develop a time-log of changes in the air flow over the blade. In either case, in order to accurately determine the quality of air flow an intensity pattern such as that shown in FIG. 5 needs to be built up over a minimum period of time. Assuming that the wind is blowing sufficiently strongly, a measurement period of a few second to a several minutes may be sufficient. Longer measurement periods however can provide a greater degree of certainty for the assessment.

To detect the accumulation of unwanted matter on the wind turbine components, periodic measurements may for example only be required a limited number of times per day. In which case, the light sensors are activated for discrete periods of time, and subsequently deactivated when not required to be in use. Where the sensors are continuously activated, the processor divides the continuous readings into discrete time windows for each sensor.

The processor 47 receives the light intensity signal from each sensor for the measurement period, and stores this in memory 49 with an indication of the time period. Each signal is then analysed to determine whether or not it is characteristic of turbulent or laminar air flow, and the result of the determination logged. It will be appreciated that the result may be a discrete value, either a positive or a negative indication of turbulence, or may be a continuous value indicating the degree to which the air flow is turbulent.

At the start of operation of a wind turbine, the blades and other wind turbine components will be largely free of dirt, but depending on the time of year, and climate conditions, ice may or may not have accumulated. At installation therefore, and assuming the blades are not pitched to cause stall-like air flow, the readings from the sensors 44 should largely indicate laminar flow. Nevertheless, particular sensors at particular times may indicate turbulent air flow, as a result of instantaneous and unpredictable variations in the air flow. Such indications would be sporadic and without pattern.

Figure 6:
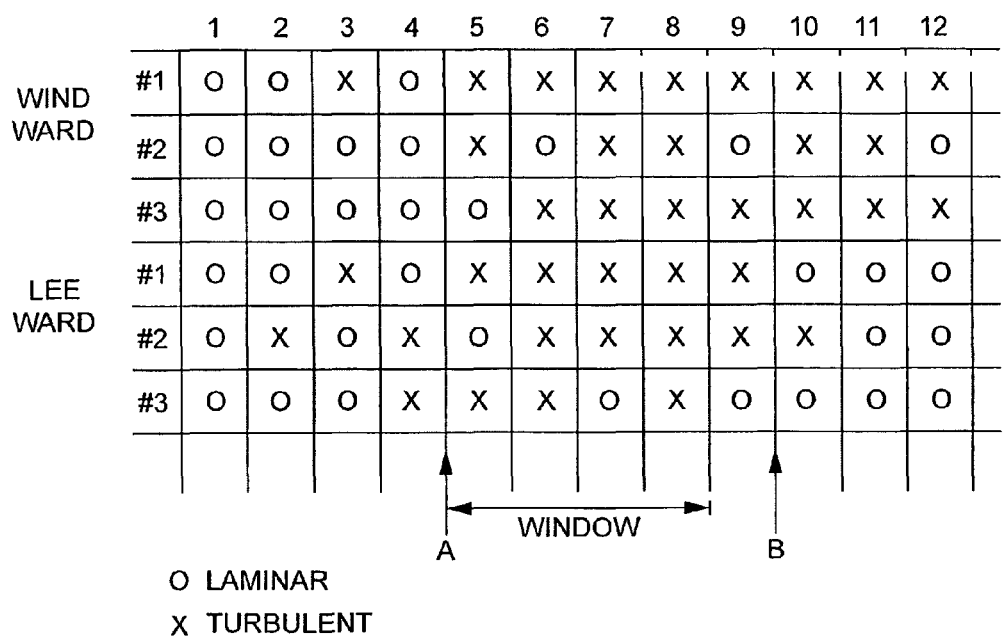
FIG. 6 is an illustration of a sensor results table used in a control and alarm system.

The results from the sensors are logged and monitored by the processor to determine larger scale changes that are indicative of problems with the component. For example, if in normal operation three sensors on a blade surface component occasionally and sporadically indicate turbulent air flow but largely give a reading consistent with laminar air flow, then a change in the system to a persistent reading of turbulence from two or more sensors might indicate that the air flow across the blade has been affected by the build up of matter, and that action needs to be taken. Such a condition is illustrated in FIG. 6, where sensor time periods are indicated by columns and individual sensor readings indicated by rows. In this diagram, two sets of three sensors located on the windward and leeward sides of a wind turbine blade are depicted.

The first four columns show an occasional turbulence detection from a sensor, but do not indicate any large scale trend. The columns after point A however show a permanent change to turbulent indications from the majority of sensors and are indicative of a problem with the blade condition. The processor may therefore detect such problems simply by counting the number of turbulence indications over a predetermined time period or window, say four or more. If a threshold count is passed, the processor issues an alarm indicating that attention is needed.

Preferably, the alarm function operates on a continuous basis such that if the turbulent conditions are no longer detected the alarm is cancelled. At point B for example, it is possible that the turbulence sensors on the leeward side of the blade will return to largely indicating a normal condition. As noted above turbulence can be a result of the blade pitch and not necessarily accumulation of unwanted matter. Thus, if turbulence is detected for an extended period of time, the processor can be configured to test the determination by reducing the blade pitch and reducing the likelihood that the turbulence is due solely to the blade angle. If doing so results in a cancellation of the alarm signal, the blades may be pitched into the wind as before to resume operation.

Increasing accumulation of matter on the blades is likely to lead to a reduced stall angle of the blades. Testing the blades by varying the pitch angle once a turbulent condition has been detected therefore provides an additional test of the extent to which matter has accumulated on the blades. If the stall angle of the blades is severely reduced by accumulated matter, then attention may be needed from a maintenance engineer.

In one embodiment, in addition to comparing the indications of individual sensors on a blade, the processor 47 compares the results from one blade to those of another. Sub-optimal turbulence performance of one blade in comparison with the other blades may indicate that the mounting of the blade on the rotor hub needs adjustment, or that the blade is not performing as well, due to stress or other factors. The processor may, if persistent sub-optimal performance is detected, issue an alarm to draw attention to the blade condition.

The sensor described above is relatively inexpensive to produce and is easy to mount. Thus, sensor systems comprising a large number of sensors can be installed relatively easily into both new and existing turbines. Furthermore, the membrane may be painted the same colour as the surrounding component surface to ensure that the visual appearance of the wind turbine is not impaired. Painting the area after mounting the sensor also has the effect that no moisture can enter the blade along the side of the sensor cavity 12 and 13 and blade 5.

The above description is intended only to be illustrative of the invention defined by the claims. Alternative techniques for implementing the invention will occur to the skilled person in the art. In one alternative embodiment, the ADC 46 and the turbulence detection part of the processor may be replaced by an analogue filter that passes the high frequencies associated with rapid deflection of the membrane 15, and a circuit that activates an output if the amount of signal within these frequencies exceeds a certain limit or rate of occurrence.

As rotor blades are susceptible to lightning strikes, the preferred device employs optical fibres as both light source and light detector in the sensor housing. In alternative embodiments however, opto-electronic devices such as light emitting diodes and photo detectors may be used directly inside the sensor housing, with appropriate electrical and signaling connections to a controller and power source. In certain embodiments it may of course be appropriate to install the control electronics and power systems locally or in the sensor itself.

Additionally, although the discussion has largely considered use of the sensors on wind turbine blades, the sensors could be installed on any wind turbine component. Further, although the sensor system is intended to indicate whether unwanted matter, such as dirt or ice has accumulated on the blade, it will be appreciated that the sensor system can be used to indicate the general condition of the blade surface.

The invention claimed is:

1. A turbulence sensor for a wind turbine component having a cavity, the turbulence sensor comprising:
    a sensor membrane comprising a first surface and an opposing second surface, the first surface being disposed in an external environment and the second surface being disposed in the cavity, the sensor membrane configured to detect turbulence of airflow moving across the first surface, wherein the sensor membrane is integral to a surface of the wind turbine component, and the sensor membrane covers at least part of the cavity;
    a light source located in the cavity and configured to illuminate the second surface of the sensor membrane with a light; and
    a light detector located in the cavity and configured to detect the light reflected from the second surface of the sensor membrane, and the light detector is configured to provide an output to a processor, wherein the processor is configured to determine from the output of the light detector a turbulence value for the airflow.

2. The turbulence sensor of claim 1, wherein the light source and light detector in the cavity are optical fibres connected to an opto-electrical light source.

3. The turbulence sensor of claim 1, further comprising an adder for adding the output associated with the light reflected from the surface of the sensor membrane to a reference light signal to give an interference pattern that indicates displacement of the sensor membrane.

4. The turbulence sensor of claim 3, wherein the adder comprises a partial mirror located in the sensor cavity, the partial mirror configured to reflect a portion of the light from the light source to the light detector and to provide the reference light signal.

5. The turbulence sensor of claim 1, wherein the cavity is sealed.

6. The turbulence sensor of claim 5, wherein the cavity is filled with a gas other than air.

7. The turbulence sensor of claim 1, wherein the sensor membrane is formed of a different material compared to a material from which the surface of the wind turbine component is formed.

8. A wind turbine comprising a turbulence sensor according to claim 1.

9. The turbulence sensor of claim 1, wherein the cavity comprises an opening formed by the surface of the wind turbine component, the opening forming a passageway between the cavity and the external environment, and wherein the sensor membrane is disposed to close the passageway.

10. The turbulence sensor of claim 9, wherein the first surface of the sensor membrane and the surface of the wind turbine blade are arranged to form a smoothly continuous blade surface.

11. A turbulence sensor for a wind turbine component having a cavity, the turbulence sensor comprising:
    a sensor membrane for detecting turbulence of airflow past a surface of the wind turbine component, wherein the sensor membrane is integral to the surface of the wind turbine component, and the sensor membrane covers at least part of the cavity;
    a light source located in the cavity and configured to illuminate a surface of the sensor membrane inside the cavity with light;
    a light detector located in the cavity and configured to detect the light reflected from the surface of the sensor membrane, and the light detector configured to provide an output to a processor, wherein the processor is configured to determine from the output of the light detector a turbulence value for the airflow across the sensor membrane;
    an adder configured to add the reflected portion of the light from the surface of the sensor membrane to a reference light signal to give an interference pattern that indicates displacement of the sensor membrane; and
    the processor configured to analyze variations in the interference pattern over a predetermined period of time to determine whether the airflow is turbulent.

12. A sensor system for detecting a surface condition of a wind turbine blade having one or more cavities, the sensor system comprising:
    one or more turbulence sensors for giving an output indicating turbulence of airflow of an external environment moving across a surface of the wind turbine blade, each of the one or more turbulence sensors associated with a respective cavity of the one or more cavities and comprising:
- a sensor membrane comprising a first surface and an opposing second surface, the first surface being disposed in an external environment and the second surface being disposed in the respective cavity, the sensor membrane configured to detect turbulence of airflow moving across the first surface, wherein the sensor membrane is integral to the surface of the wind turbine blade, and the sensor membrane covers at least part of the respective cavity,
- a light source located in the respective cavity and configured to illuminate the second surface of the sensor membrane with a light, and
- a light detector located in the respective cavity and configured to detect the light reflected from the second surface of the sensor membrane, and the light detector is configured to provide an output to a processor;

a memory; and the processor, wherein the processor determines a condition of the surface of the wind turbine blade from the output received from the one or more turbulence sensors.

13. The sensor system of claim 12, wherein the memory records the output received from the one or more turbulence sensors over a period of time, and the processor determines the condition of the surface of the wind turbine blade based on a change in the output compared with output previously received.

14. The sensor system of claim 12, comprising a plurality of the one or more turbulence sensors on windward and leeward sides of the wind turbine blade.

15. The sensor system of claim 12, wherein the processor compares the output from the one or more turbulence sensors of the wind turbine blade, with output from one or more turbulence sensors of another wind turbine blade.

16. The sensor system of claim 12, wherein the sensor system detects an accumulation of matter on the surface of the wind turbine blade.

17. The sensor system of claim 16, wherein the processor determines the condition of the surface of the wind turbine blade, in which matter has accumulated on the surface of the wind turbine blade, when a predetermined number of the one or more turbulence sensors indicate turbulence.

18. A wind turbine comprising the sensor system of claim 12.

19. The turbulence sensor of claim 12, wherein the wind turbine component is a wind turbine blade.

* * * * *